United States Patent [19]
Kellar

[11] 4,403,250
[45] Sep. 6, 1983

[54] PROCESSING OF T.V. PICTURES FOR SUBSEQUENT STOP MODE REPRODUCTION

[75] Inventor: Paul R. N. Kellar, Newbury, England

[73] Assignee: Micro Consultants Limited, Berkshire, England

[21] Appl. No.: 241,978

[22] Filed: Mar. 9, 1981

[30] Foreign Application Priority Data

Mar. 18, 1980 [GB] United Kingdom ................ 8009054

[51] Int. Cl.³ .......................... H04N 7/02; H04N 5/76
[52] U.S. Cl. .................................... 358/105; 358/335; 360/10.1; 360/35.1; 360/33.1
[58] Field of Search ............ 358/105, 160, 127, 128.5, 358/128.6, 335, 342; 360/10, 35, 11, 10.1, 11.1, 35.1, 33.1

[56] References Cited

U.S. PATENT DOCUMENTS

4,058,840 11/1977 Kasprapk ............................... 360/10
4,272,787 6/1981 Michael .................................. 360/10

FOREIGN PATENT DOCUMENTS

2376486 9/1978 France ................................ 360/10.1

Primary Examiner—Alan Faber
Attorney, Agent, or Firm—Dowell & Dowell

[57] ABSTRACT

A processing system for manipulating data prior to a recording process so that subsequent picture stop mode reproduction can be a achieved on replay from a recording medium such as a video disc gives optimum resolution. The processing system includes a frame store 15 for holding incoming video data and a movement detector 23 for detecting picture movement during any portion of the incoming video frame which movement information is held in a movement data store 24. A selector 18 controls the information from the frame store whereby the data read out is from a single field of the frame during those portions of the picture where movement has occurred, and from both fields in the frame when no picture movement has occurred in that portion of the picture. This outgoing information can be recorded on the video disc 22 and will appear as normal moving video information unless the stop mode is selected. When the stop mode is selected the information appears with full vertical resolution.

11 Claims, 5 Drawing Figures

PROCESSING OF T.V. PICTURES FOR SUBSEQUENT STOP MODE REPRODUCTION

BACKGROUND TO THE INVENTION

The invention relates to a T.V. picture freeze system and method suitable for manipulating picture information recorded on a storage medium, for example a video disc.

With video discs for example, it has been proposed to freeze the picture on play-back by repeating a portion of the data held on the disc. If the repeated portion comprises both fields of the frozen frame then judder of the moving portion of the picture will occur if there is any movement occurring thereon. To overcome this problem it has been suggested to record only single field information on a repeated field basis of the frame when making the records. In this situation both the moved and stationary portions of the picture suffer a two to one loss in vertical resolution.

OBJECT OF THE INVENTION

The present invention is concerned with improving the freeze representation to provide a picture substantially free of flicker but still with full vertical resolution in the stationary part of the picture.

SUMMARY OF THE INVENTION

According to the invention there is provided a processing system for manipulating data prior to a recording process so that subsequent picture freezing on replay gives optimum resolution comprising frame storage means for holding incoming video data, movement detector means for detecting picture movement during any portion of the video frame, movement data storage means for storing information on detected movement from said detector means, and selector means for controlling the output from the frame storage means whereby the data read out from said frame storage means is derived from a single field of the frame during those portions of the picture where movement occurred as detected by said detecting means and in dependence on the information available from said data storage means, and from both fields in the frame when no picture movement has occurred in that portion of the picture.

Further according to the invention there is provided a method of processing a T.V. picture prior to a recording process so that subsequent picture freezing on replay gives optimum resolution which picture may have at least some parts which have moved relative to a previous frame, said method comprising storing picture information from first and second fields of the television picture, detecting any picture movement present on the information and storing data thereon, and selectively outputting information derived from a single or both fields of the picture in dependence on the stored movement data.

According to a further aspect of the invention there is provided a recording medium containing video information corresponding to a plurality of video frames containing picture movement, said information comprising recorded information derived from a single field during any parts of the frames containing picture movement and recorded dual field information during any parts of the frames not containing picture movement.

According to a still further aspect of the invention there is provided a method of producing recorded video information on a recording medium comprising the steps of storing picture information from first and second fields of a television picture; detecting any picture movement present on the information and storing data thereon, selectively outputting information derived from a single or both fields of the picture in dependence on the stored movement data, and recording the processed information on to the recording medium to allow an enhanced frozen picture to be generated on play-back.

According to another aspect of the invention there is provided a recording medium containing video information processed and recorded by the method of storing picture information from first and second fields of a television picture; detecting any picture movement present on the information and storing data thereon, selectively outputting information derived from a single or both fields of the picture in dependence on the stored movement data, and recording the processed information on the recording medium.

BRIEF DESCRIPTION OF THE DRAWINGS

The invention will now be described by way of example with reference to the accompanying drawings, wherein.

DESCRIPTION OF PREFERRED EMBODIMENT

Figure 1:
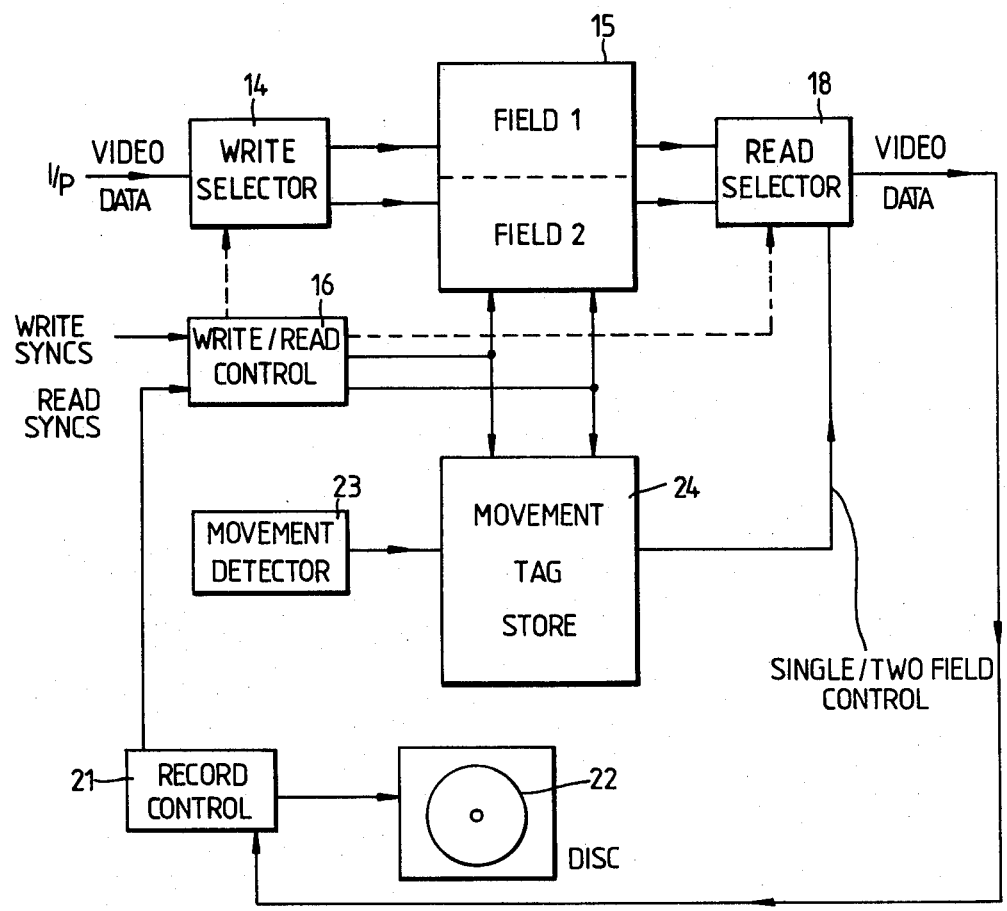
FIG. 1 shows an arrangement forming an embodiment of the present invention suitable for controlling the data recorded on the video disc.

FIG. 1 shows a recording system in which picture movement is detected and compensated for during the process of recording of the video data onto the disc. The incoming video typically in 8 bit form is received by the system and passes via write selector 14 to the frame store 15, which selector inputs the data corresponding to field 1 into the frame store. If the video information is in analogue form then an analogue to digital converter may be provided prior to frame store 15. The write in and read out of the data into the frame store is under the control of write/read control 16. From the incoming sync information, the write control will be able to determine the start of a new field and will control selector 14 accordingly. This sync information may be derived from the normal composite video in known manner, or from the write available from write/read control 16. The data read out from the frame store passes via read selector 18 for receipt by the record control 21 which controls recording onto the video disc 22.

The read selector 18 can expediently determine a change in field by means of the read syncs available from control 16.

Figure 2:
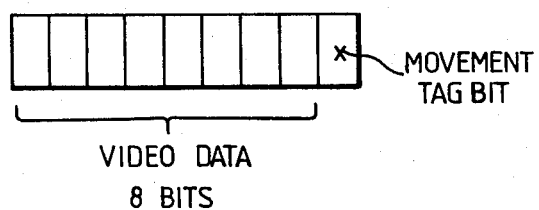
FIG. 2 shows the arrangement of the video data including a movement tag.

The system also includes a movement detector 23 which detects any picture movement occurring on the incoming data and provides a movement tag bit which is stored in movement tag store 24 to provide identification at the output side of the frame store 15 of that portion of the picture which has or has not moved. The movement tag store 24 is also under the control of write/read control 16 in a similar manner to frame store 15. Although the movement tag store 24 has been shown as a separate store, this could be incorporated within the normal frame store 15 so that the movement tag bit would accompany the 8 bits of video date in the manner shown in FIG. 2.

The write selector is switched to input the incoming information into the first or second field storage area of frame store 15, which information is written into the store under the direction of control 16. Desired locations within store 15 are addressed by means of internal picture point counters within control 16. Similarly read counters within control 16 determine the addressing for read out from the store. The read selector 18 is capable of being switched as many times as required during a frame to select the required field in dependence on any movement previously detected picture point by picture point and held in the tag store 24. The stored video information is updated frame by frame so that the data is continually being replaced by the incoming data via selector 14 and the movement tag data is continually changing also.

Figure 4:
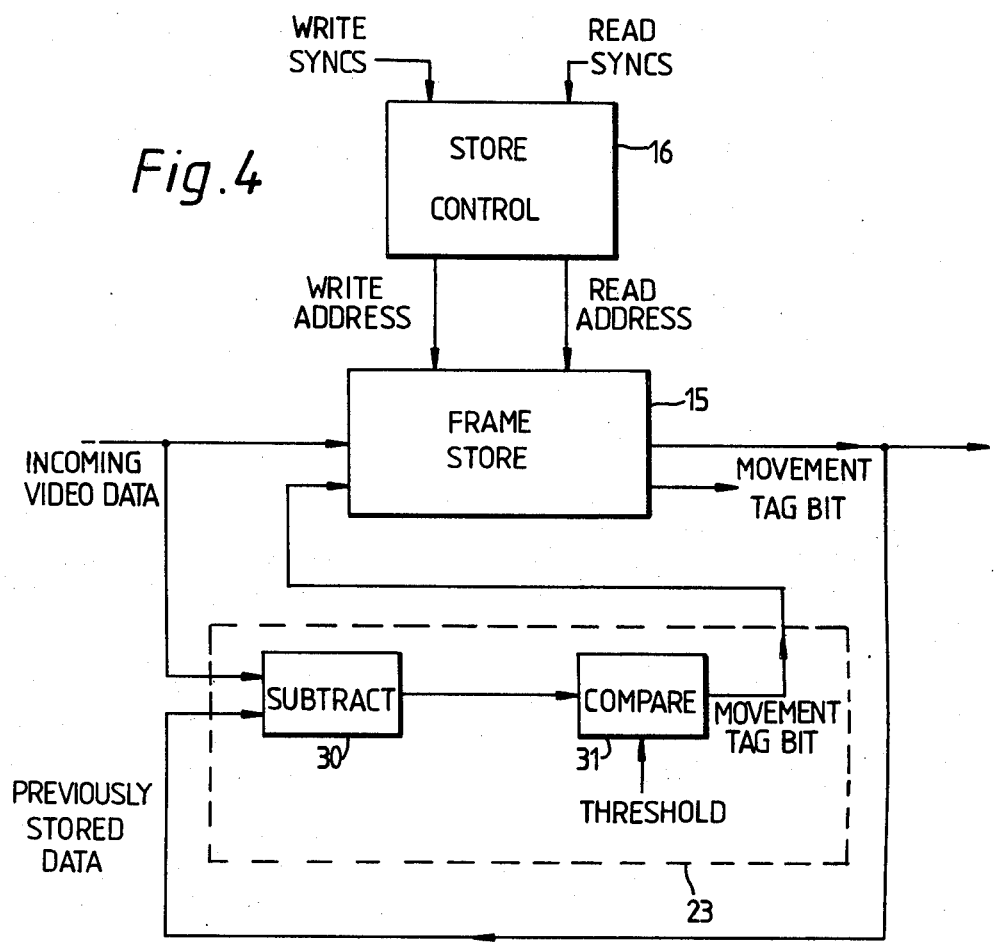
FIG. 4 shows the movement detector mechanism of FIG. 1 in more detail and a combined store for movement and video data.

An alternative arrangement for providing combined storage of the data and movement tag is shown in FIG. 4. It will be seen that the frame store 15 is under the control of store control 16 as before, but the movement tag generated by detector 23 is stored for example as the least significant bit accompanying the video data. The movement detector may typically comprise a subtractor 30 for subtracting incoming video data from previously stored data to determine any difference therebetween; this difference being compared with a threshold level in comparator 31 so as to produce a logically high or low output in dependence on the degree of movement detected. The other parts of the system, although not shown would typically be the same as those in FIG. 1.

Figure 3:
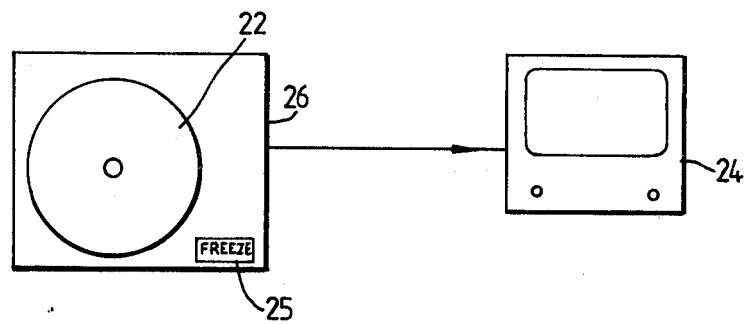
FIG. 3 shows an embodiment of the play-back system with the facility for picture freeze.

On play-back as shown in FIG. 3, the disc 22 placed in player 26 and its output received by television 24 which, in the normal play-back mode, will appear to the viewer as a standard moving picture. However, when picture freeze is selected using control 25, that selected frame is repeated so as to provide a frozen picture. However, because of the way in which the data was recorded on the disc the picture information is effectively that from two fields when no movement is occurring on that portion of the picture, and from a single field during portions of the picture where movement is occurring. This has the effect of providing a frozen picture on play-back which is substantially free of smearing or flicker. Thus the disc play-back system 26 can be a standard item which includes the normal freeze select, and can provide enhanced pictures due to the fact that the manipulation was effected during recording.

No modification or further expense is therefore required when manufacturing the play-back system, which will automatically provide the correct data from both or single repeated field because this manipulation was effected during recording.

Although the arrangement has been described as used with video discs, other media could be used (for example video tape).

Figure 5:
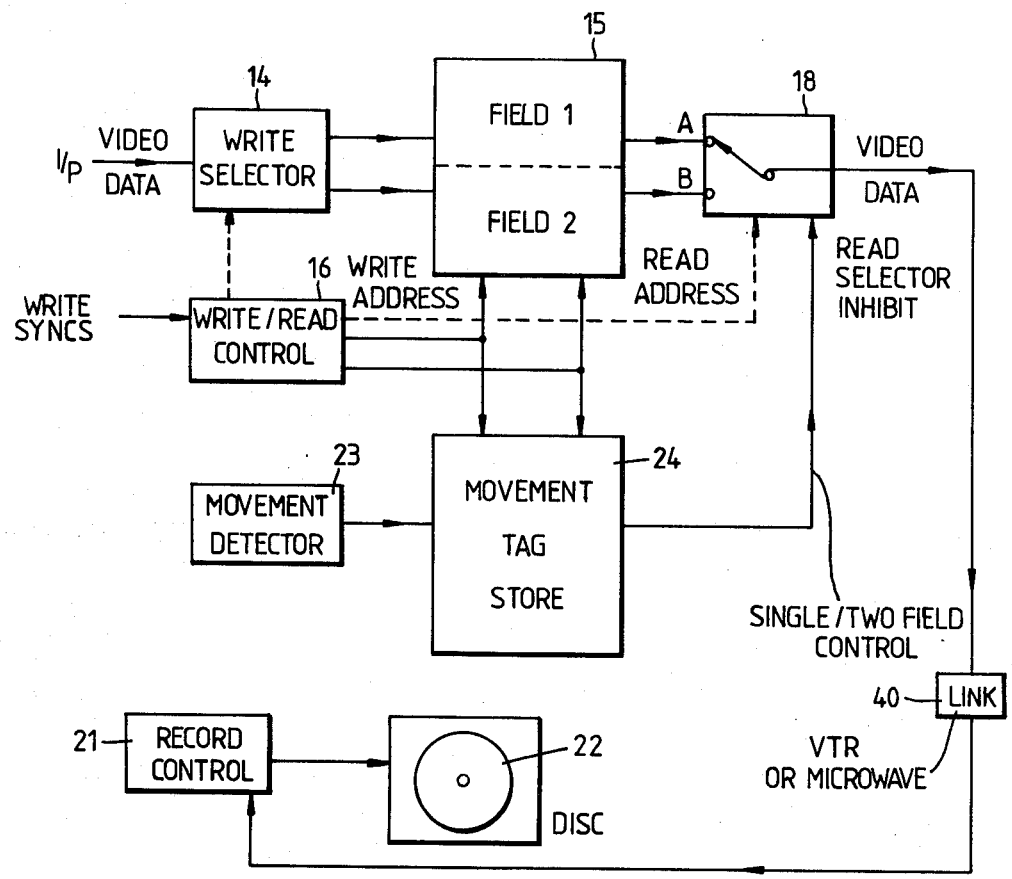
FIG. 5 shows an alternative embodiment to FIG. 1.

In an alternative embodiment shown in FIG. 5, the output from the read selector 18 is not received directly by record control 21 (as in FIG. 1) but via an intermediate link 40. In this situation control 16 of the read side of the system can make use of the write syncs to control the outputting of the data to link 40.

The link can be used to provide remote recording using control 21 for disc 22. A real time interconnection can be provided if link 40 is a microwave link or non-real time if the link 40 is a VTR for example so that recording onto the VTR is equivalent to transmit and playback thereon is equivalent to receive.

The read selector 18 is shown in more detail as a mechanical switch.

The movement detector 23 output bit (high or low in dependence on any movement detected) is written into tag store 24 which may conveniently be a single bit version of frame store 15 and use the same store control 16. When the data from the frame store is being read out, the tag data will also be read out as dictated by control 16 and this data bit will simply determine whether the selector is allowed to be moved to position A or B. In normal circumstances, sequencer would be in position A during field 1 and position B for field 2 under the guidance of control 16. In the present configuration the selector is held in (say) position A for both fields when moving points of the picture are being read out (as indicated by the state of the movement tag) and will be switched into position A for field 1 and position B for field 2 when no movement is present (as indicated by the state of the movement tag). Read selector 18 can be realised using standard solid state switching, the tag providing the logic level to supply the required inhibit control. The output from selector 18 can be converted back into analog form and chrominance and luminance encoded as desired.

In this system, a combination of single field and two field reproduction is utilised in order to optimise the resultant information which eventually (following recording on the disc) can be selected to provide a frozen picture.

By utilizing the parts of the two frames which remain still and parts of a single frame which is moving for subsequent recording on disc 22 it is possible on playback of the disc to reconstruct a frozen picture with full detail whenever possible.

Thus pre-recorded video discs can expediently be marketed which have been processed in the manner described above and the purchaser can play back such a disc in the normal (moving picture) mode without any degredation being apparent yet in the freeze frame mode (full frame) will have a frozen picture with enhanced detail over normally recorded discs.

This system has been described generally as repeating a single field during moving portions. It is to be understood that by using interpolation techniques the repeated single field can be made representative of the omitted field.

I claim:
1. A processing system for manipulating data of a moving picture sequence comprising:
frame storage means for holding incoming video data;
movement detector means for detecting picture movement during any portion of the video frame;
movement data storage means for storing information on detected movement from said detector means;
selector means for controlling the output from the frame storage means whereby the data read out from said frame storage means is derived from a single field of the frame during those portions of each picture of the moving picture sequence where movement occurred as detected by said detecting means and in dependence on the information available from said data storage means, and from both fields in the frame when no picture movement has occurred in that portion of that picture of the moving picture sequence; and recording means for recording said video data from said selector means.

2. A system according to claim 1, wherein the recording means comprises a video disc recorder with associated control means.

3. A system according to claim 1, including a data link for providing the manipulated data for the recording means.

4. A system according to claim 1, wherein the frame storage means and the movement data storage means comprise a combined solid state store to allow the movement data to accompany the picture information.

5. A system according to claim 1, wherein the frame storage means and the movement date storage means comprises separate solid state stores.

6. A system according to claim 1, wherein the selector means comprises a read selector normally switchable to select the first or second fields of each frame of the moving picture sequence in dependence on which field the output information was derived and adapted to be inhibited to only allow the selector to select data from each field when portions of that picture not containing movement are present.

7. A method of processing a moving T.V. picture sequence having at least some parts which have moved relative to a previous frame, said method comprising:
    storing picture information from first and second field of each television picture;
    detecting any picture movement present on the information and storing movement data thereon,
    selectively outputting information derived from a single or both fields of each picture of the moving picture sequence in dependence on the stored movement data; and
    recording said selectively outputted information.

8. A method according to claim 7, including storing the movement data with the picture information to allow the data to accompany the picture information.

9. A method according to claim 7, wherein the information is selected from both fields of each frame of the moving picture sequence when no movement has been detected for that portion of a picture and from a single field during parts of the picture where movement has occurred.

10. A recording medium containing video information corresponding to a plurality of video frames containing a moving picture sequence, said information comprising recorded information derived from a single field during any parts of the frames containing picture movement and recorded information derived from both fields of a frame during any parts of the frames not containing picture movement.

11. A method of recording video information of a moving picture sequence on a recording medium comprising the steps of:
    storing picture information from first and second fields of each television picture;
    detecting any picture movement present in the information and storing data thereon;
    selectively outputting information derived from a single or both fields of each stored picture of the moving picture sequence in dependence on the stored movement data, and
    recording the selectively outputted processed information onto the recording medium.

* * * * *